United States Patent
Christenson et al.

(10) Patent No.: US 6,358,349 B1
(45) Date of Patent: Mar. 19, 2002

(54) METHOD TO IMPROVE ADHESION BETWEEN PRE-CURED ELASTOMER AND METAL SURFACE

(75) Inventors: Bruce Christenson, Traverse City; Gary Veselica, Clarkelake, both of MI (US)

(73) Assignee: Eagle-Picher Industries, Inc., Cincinnati, OH (US)

(*) Notice: Subject to any disclaimer, the term of this patent is extended or adjusted under 35 U.S.C. 154(b) by 0 days.

(21) Appl. No.: 09/345,977

(22) Filed: Jul. 1, 1999

(51) Int. Cl.$^7$ .................. B23P 19/02; B29C 65/54; B29C 65/56; B29C 65/64
(52) U.S. Cl. .................. 156/165; 29/469.5; 29/525; 156/294; 156/325
(58) Field of Search ............... 156/165, 294, 156/325; 29/458, 469.5, 525; 74/574; 267/281, 141.2, 141

(56) References Cited

U.S. PATENT DOCUMENTS

| | | | |
|---|---|---|---|
| 2,877,543 A | * 3/1959 | Myers .................. | 29/235 |
| 3,175,636 A | 3/1965 | Winkelmann .................. | 180/70 |
| 3,287,197 A | 11/1966 | Errede .................. | 156/272 |
| 3,387,839 A | * 6/1968 | Miller et al. .................. | 156/294 |
| 3,560,034 A | * 2/1971 | Hipsher et al. .................. | 403/228 |
| 3,634,146 A | 1/1972 | Wystrach et al. ...... | 148/6.15 R |
| 3,799,838 A | 3/1974 | Shaw et al. .................. | 161/207 |
| 3,893,775 A | * 7/1975 | Sievers et al. .................. | 267/281 |
| 3,955,861 A | 5/1976 | Orain .................. | 308/189 R |
| 3,976,624 A | 8/1976 | Inouye et al. .................. | 260/79.5 B |
| 4,073,047 A | 2/1978 | Fishbaugh et al. ....... | 30/346.53 |
| 4,102,046 A | 7/1978 | Downing et al. .................. | 29/458 |
| 4,297,159 A | 10/1981 | Dobias et al. .................. | 156/307.7 |
| 4,383,074 A | * 5/1983 | Kuan .................. | 428/36.8 |
| 4,536,225 A | 8/1985 | Cayless et al. ......... | 148/6.15 R |
| 4,806,437 A | * 2/1989 | Yokoi et al. .................. | 267/141 |
| 4,889,578 A | * 12/1989 | Kei et al. .................. | 156/294 |
| 5,036,943 A | 8/1991 | Kashiwagi .................. | 180/380 |
| 5,093,204 A | 3/1992 | Watanabe et al. .......... | 428/463 |
| 5,145,025 A | 9/1992 | Damian .................. | 180/381 |
| 5,185,916 A | 2/1993 | Maeno et al. .................. | 29/525 |
| 5,300,158 A | 4/1994 | Chen et al. .................. | 148/258 |
| 5,316,810 A | 5/1994 | Rogerson .................. | 428/35.7 |
| 5,401,334 A | 3/1995 | O'Melia et al. .................. | 148/265 |
| 5,506,059 A | 4/1996 | Robbins et al. .................. | 428/457 |
| 5,531,841 A | 7/1996 | O'Melia et al. .................. | 148/265 |
| 5,579,661 A | 12/1996 | Yarnell et al. .................. | 74/473 R |
| 5,884,902 A | 3/1999 | Hamada et al. .................. | 267/141 |

FOREIGN PATENT DOCUMENTS

EP 514329 * 11/1992 .................. 156/294

OTHER PUBLICATIONS

Kirk–Othmer, *Encyclopedia of Chemical Technology*, vol. 8, pp. 492–500, 1979.*

* cited by examiner

*Primary Examiner*—Steven D. Maki
(74) *Attorney, Agent, or Firm*—Wood, Herron & Evans, LLP

(57) ABSTRACT

The bond strength between a pre-cured elastomeric member and a metal surface is increased by applying a phosphate coating to the metal surface. This is particularly suitable for use in formation of torsional vibration dampeners wherein an elastomeric member is compression fitted between an outer annular ring and a hub thereby decreasing slippage between the annular weight and the hub.

1 Claim, 1 Drawing Sheet

METHOD TO IMPROVE ADHESION BETWEEN PRE-CURED ELASTOMER AND METAL SURFACE

BACKGROUND OF THE INVENTION

Motors, particularly gas powered motors or automobile engines, create a significant amount of vibration. For example, the action of the cam shaft creates torsional vibration. Torsional vibration can be reduced by using a vibration dampener. Typically the dampener mounts to the drive shaft and includes an annular weight fixed to a hub by an elastomeric member. A pulley may ride on the exterior surface of annular weight. Regardless, it is important that the weight not slip relative to the hub.

The elastomeric member or ring can be formed in a number of different ways. The elastomer can be injection molded between the annular weight and the hub and cured in place. This is by far the strongest bond that can be achieved in the torsional vibration dampener. Alternately a pre-formed or pre-cured elastomeric ring can be forced between the annular weight and the hub. Adhesive can be pre-applied to either surface to improve the bond between the metal weight and the metal hub.

The least expensive torsional vibration dampener simply uses a pre-cured elastomeric member which is compressed and force-fitted between the annular ring and hub. The resulting compression provides a strong bond between the annular ring and hub and prevents relative slippage. However, as this heats, the elastomeric member softens and slipping is a more significant problem.

The concern with relative movement between a elastomeric member and a metal member can be found in other applications such as the rubber bushing on a shock absorber.

SUMMARY OF THE INVENTION

The present invention is premised on the realization that the bond between a previously cured elastomeric member and a metal surface can be significantly enhanced by phosphating the metal surface prior to compression fitting the elastomeric member to the metal member.

Further with certain elastomeric members the bond strength between the metal surface and the elastomeric member can increase as the composite structure is heat aged as might occur during use. The phosphated surface actually promotes a bond between the metal surface and the elastomeric member particularly with respect to pre-cured EPDM and pre-cured ethylene acrylates.

The objects and advantages of the present invention will be further appreciated in light of the following detailed description and drawings in which:

DETAILED DESCRIPTION

According to the present invention, the bond strength between a metal surface and a compression fitted rubber surface is improved by phosphating the metal surface prior to compression fitting the rubber member against the metal surface. As described below, the present invention is particularly useful in the formation of torsional vibration dampeners. The same invention can also be used in other applications such a rubber bushings attached to shock absorbers and the like. However, the invention will be particularly described with respect to a torsional vibration dampener.

Figure 1:
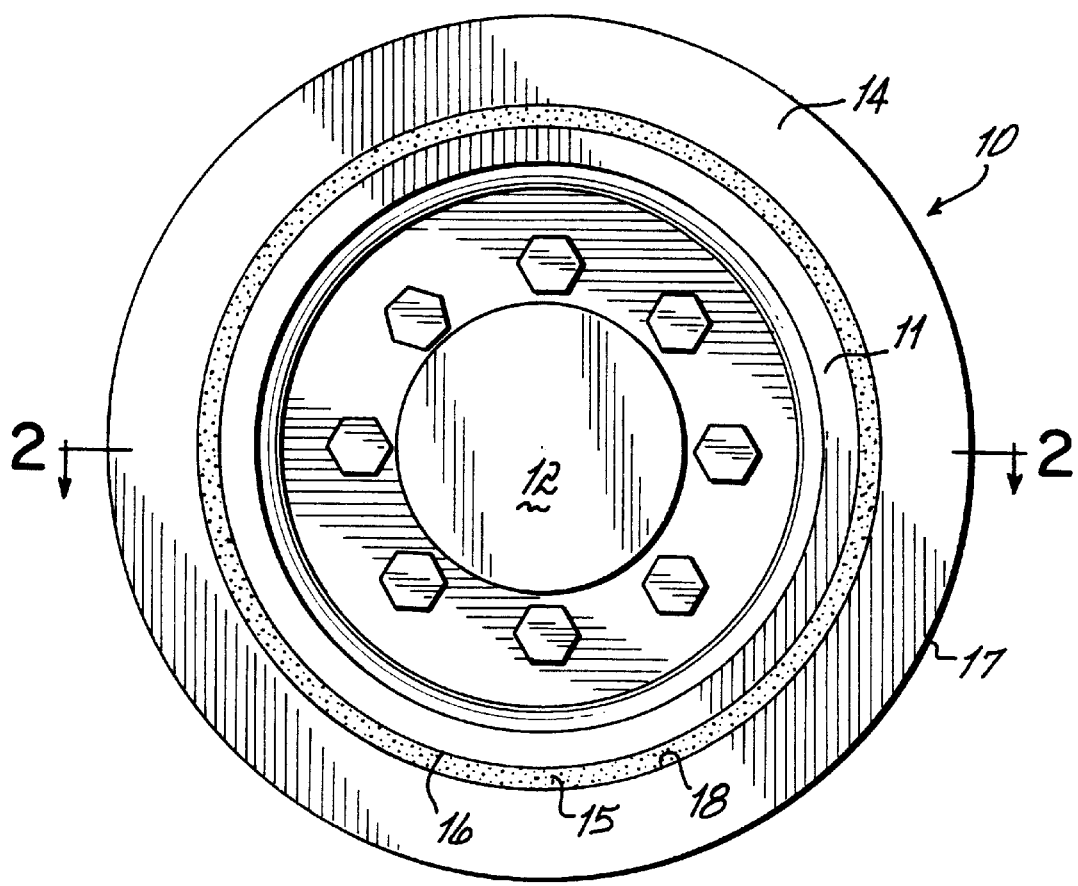
FIG. 1 is a front view of a vibration dampener.
Figure 2:
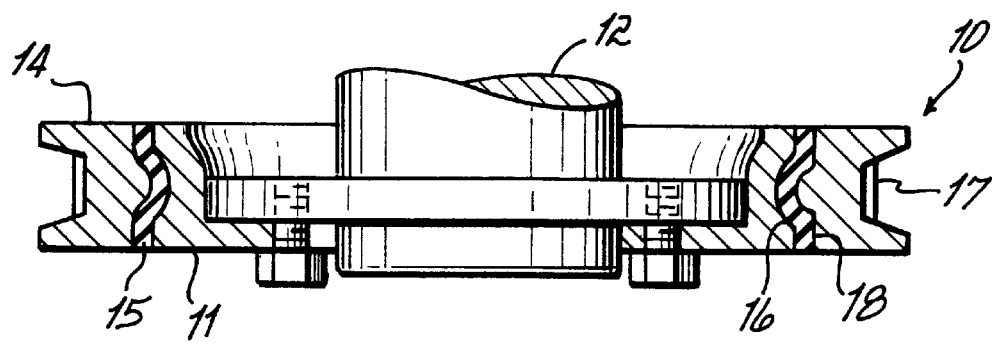
FIG. 2 is a cross-sectional view taken at lines 2—2 of FIG. 1.

There are a vast number of different designs of torsional vibration dampeners. Exemplary vibration dampeners are disclosed in U.S. Pat. No. 4,710,152 and U.S. Pat. No. 5,231,893. The vibration dampener 10 shown in FIG. 1 is itself merely exemplary as shown as with all torsional vibration dampeners, there is a hub portion 11 which attaches to a rotating shaft 12 of an internal combustion engine (not shown). The hub 11 in turn is attached to an annular weight or inertia ring 14 by an elastomeric ring 15 compression fitted between the annular weight 14 and an outer annular surface 16 of the hub 11. The annular weight 14 may include an outer surface 17 which is a belt driving surface designed to drive an engine belt (not shown) which is in turn used to drive the alternator, power steering compressor, air conditioner compressor or the like. The elastomeric 15 member is held in compression between an inner surface 18 of the annular weight and an outer surface 16 of the hub 11.

The elastomeric member can be a wide variety of different elastomers and is cured prior to assembly. The elastomeric member can be for example natural rubber or synthetic elastomer. Suitable elastomers include EPDM, styrene butadiene rubber, isoprene rubber, nitrile rubber, ethylene propylene copolymer and ethylene acrylic copolymer. The selection of the particular elastomeric member simply depends on the particular application. With respect to torsional vibration dampeners, the elastomer and its formulation are dictated by customer demand and performance requirements. An exemplary EPDM formula is shown below.

| INGREDIENT | DESCRIPTION DETAILS | PARTS |
|---|---|---|
| EPDM | BASE POLYMER<br>Mw/Mn = 3.0–7.0<br>% Unsaturation = 3–10%<br>Ethylene %-wt. = 50–75% | 100 |
| CARBON BLACK | Filler | 20–70 |
| PLASTICIZER | Paraffinic oil | 5–30 |
| ZINC OXIDE | Curing agent | 2–10 |
| CO-AGENT | Trifunctional methacrylate | 1–7 |
| ANTIOXIDANT | Ozone Inhibitor | .5–5.0 |
| PEROXIDE | Curing agent | 1–7 |

One skilled in the art can vary this widely or use different elastomer formulations to achieve the desired result.

The hub itself and the weight are both metal. Generally these will be formed from automotive ductile cast iron, automotive gray cast iron, steel or aluminum. The hub preferably will use automotive ductile cast iron whereas the weight is preferably automotive gray cast iron although this is not essential for use in the present invention.

Both the annular weight, particularly its inner surface, and the hub, particularly its outer annular surface, are subjected to a phosphatizing treatment. In such a treatment the surfaces are first subjected to an alkaline wash by immersing or spraying the metal with an aqueous alkaline solution having a pH of 9–13. The pH is established by a sodium hydroxide solution. This can be heated if necessary depending upon how dirty the metal surface is. Generally this would take a matter of a few seconds to several minutes to accomplish. The metal is then rinsed with tap water.

The phosphatizing agent is an acidic aqueous solution of phosphate ion. The phosphate may be any soluble phosphate including zinc phosphate, iron phosphate, calcium phosphate and mixed calcium zinc phosphate. Iron phosphate is preferred. The concentration of the phosphate ion should be 1 to 4% and the pH of the bath should be 2 to 6.

Some phosphatizing baths include certain accelerators. These are all well known in the art. Accelerators that are acceptable for use in the present invention include sodium chlorate, sodium molybdate, sodium nitrobenzene sulfonate, sodium nitrate, sodium nitrite, hydroxyl amine sulphate, sodium borate, plus other metal or amine salts of the above. Particular phosphatizing agents can be purchased from Parker, DuBois Chemical and Betz Dearborn. These are used per the manufacturer's instructions.

Preferably the parts are simply immersed in the phosphatizing bath at a temperature of 110 to about 150° F. for a period of about 50 to about 150 seconds. The parts are then removed and dried.

The torsional vibration dampener is assembled by holding the hub and the annular weight in a jig or fixture leaving an annular space between the two. The elastomeric member is then placed in an appropriate fixture or annular space and hydraulic or pneumatic pressure is applied to force the elastomeric member into the annular space. Adhesive is not applied to either surface of the annular weight or the hub.

For use in the present invention, two preferred elastomeric members are ethylene propylene diene monomer rubber and ethylene acrylate polymers. The present invention improves the grip strength between any elastomeric member and the inner surface of the annular weight or the outer surface of the hub. When EPDM or ethylene acrylate copolymer are used, the bond strength between the elastomeric member and the phosphated metal surfaces actually increases as surfaces are heated over time. This heating typically occurs during use. For example an automobile's torsional vibration dampener is subject to elevated temperatures (in excess of 100° C.) for extended periods of time. This heat aging increases bond strength.

This has been a description of the present invention along with the preferred method of practicing the invention. However, the invention itself should only be defined by the appended claims wherein

We claim:

1. A method of forming a vibration dampener comprising an annular metal weight, a metal hub and an elastomeric member formed from a polymer selected from the group consisting of ethylene propylene dienemonomer rubber and ethylene acrylate copolymer compression fitted there between comprising applying a phosphate coating to an inner surface of said annular weight and an outer ring of said hub and compression fitting said elastomeric member between said annular weight and said hub with said elastomeric member contacting said phosphate coated surfaces of said annular weight and said hub wherein said rubber is a pre-cured elastomeric member.

* * * * *